United States Patent [19]
Belscher et al.

[11] Patent Number: 5,851,366
[45] Date of Patent: *Dec. 22, 1998

[54] ADHERING METAL TO GLASS

[75] Inventors: Kay M. Belscher, Bath; LeRoy R. Morse, Campbell, both of N.Y.; Fumio Okamoto, Kanagawa, Japan; B. Jean Sterlace, Painted Post, N.Y.

[73] Assignee: Corning Incorporated, Corning, N.Y.

[ * ] Notice: The term of this patent shall not extend beyond the expiration date of Pat. No. 5,792,327.

[21] Appl. No.: 576,925

[22] Filed: Dec. 22, 1995

Related U.S. Application Data

[63] Continuation-in-part of Ser. No. 277,408, Jul. 19, 1994, abandoned, and Ser. No. 473,190, Jun. 29, 1995, Pat. No. 5,792,327.

[51] Int. Cl.$^6$ .................................................. C23C 14/34
[52] U.S. Cl. .............................. 204/192.26; 204/192.29; 204/192.15; 204/192.27; 204/192.28; 204/192.22
[58] Field of Search ........................ 204/192.15, 192.27, 204/192.28, 192.29, 192.22

[56] References Cited

U.S. PATENT DOCUMENTS

| | | | |
|---|---|---|---|
| 3,428,475 | 2/1969 | Teeg | 117/54 |
| 3,686,020 | 8/1972 | Coll-Palagos | 117/54 |
| 3,857,689 | 12/1974 | Koizumi et al. | 65/30 |
| 4,017,291 | 4/1977 | Gliemeroth et al. | 65/30 |
| 4,019,884 | 4/1977 | Elmer et al. | 65/30 |
| 4,415,404 | 11/1983 | Riegl | 156/635 |
| 4,477,364 | 10/1984 | Garcia | 252/142 |
| 4,555,304 | 11/1985 | Sälzle | 156/663 |
| 4,652,459 | 3/1987 | Engelhardt | 427/2 |
| 4,731,958 | 3/1988 | Kishishita et al. | 51/283 |
| 4,832,988 | 5/1989 | Bogenschütz et al. | 427/305 |
| 4,946,546 | 8/1990 | Bourgeois-Moine | 156/643 |
| 5,049,414 | 9/1991 | Kato | 427/164 |
| 5,091,053 | 2/1992 | Blonder et al. | 156/657 |
| 5,102,691 | 4/1992 | Russo et al. | 427/109 |
| 5,200,024 | 4/1993 | Blonder et al. | 156/628 |
| 5,244,847 | 9/1993 | Kushitani et al. | 501/66 |

FOREIGN PATENT DOCUMENTS

| | | |
|---|---|---|
| 0 444 809 A1 | 9/1991 | European Pat. Off. . |
| 0 607 865 A1 | 7/1994 | European Pat. Off. . |
| 62-227130 | 10/1987 | Japan . |
| 3-107128 | 5/1991 | Japan . |
| 5-127014 | 5/1993 | Japan . |
| 7-206474 | 8/1995 | Japan . |
| 7-281007 | 10/1995 | Japan . |
| 7-286172 | 10/1995 | Japan . |

OTHER PUBLICATIONS

G.A.C.M. Spierings, J. Van Dijk, Philips Research Laboratories, "Dissolution of $Na_2O$–Mg)–CaO–$SiO_2$ glass in aqueous HF solutions", Journal of Materials Science 22 (1987), No. 5, pp. 1869–1874.

*Primary Examiner*—Nam Nguyen
*Attorney, Agent, or Firm*—Robert L. Carlson

[57] ABSTRACT

A method of improving adherence of a metal film deposited directly on a silicate glass substrate for a display panel. The method comprises chemically treating the surface of the glass to alter its surface characteristics and thereby improve adhesion robustness of the metal film to the glass surface.

21 Claims, No Drawings

ADHERING METAL TO GLASS

This application is a Continuation-In-Part of U.S. patent application Ser. Nos. 08/277,408, filed Jul. 19, 1994, now abandoned, titled "ADHERING METAL TO GLASS", and 08/473,190, filed Jun. 29, 1995, now U.S. Pat. No. 5,792,327, which is also titled "ADHERING METAL TO GLASS".

FIELD OF THE INVENTION

Method of promoting adherence of a metal film deposited on a glass substrate, particularly for electronic applications.

BACKGROUND OF THE INVENTION

Production of electronic and opto-electronic devices may require depositing a metal film onto a glass substrate. This requirement is prevalent in producing devices employed in the rapidly growing field of display technology.

One application is production of thin film transistors (TFTs) for liquid crystal display (LCD) devices, in particular, active matrix (AMLCD) devices. In this application, the TFTs are produced on one glass panel of the display device. Another application in display technology is AMLCDs in which the active element is a diode of the Metal-Insulator-Metal (MIM) type.

The typical amorphous-silicon TFT configuration used in AMLCDs is the bottom-gate inverted structure. The first step in producing such a TFT configuration consists of depositing a barrier layer on one face of a thin glass sheet that forms a panel in the AMLCD device, and then depositing a metal film on top of the barrier layer. The metal film is then patterned by selective etching to form rows of conducting lines referred to as gate lines. These lines are electrically connected to a driver chip connected to the glass sheet.

The metal film may be deposited by any process known for this purpose. For example, one method of depositing the metal film for this purpose is by sputtering. Metal may be sputtered by a DC magnetron to deposit a film on a glass panel, the glass rising to a temperature of 200°–300° C. during the process. A metal film can be laid down at a rate greater than about 30 nm/minute by sputtering in an argon atmosphere at a pressure of less than 10 mT.

The advanced flat panel display industry is driving continuously and aggressively to lower cost and higher performance display products. As a result, AMLCD-manufacturers are aggressively pursuing means to eliminate process steps and increase line productivity. One example is the elimination of an oxide barrier layer between the substrate and overlaying TFT (thin film transistor) devices, enabled by the commercial availability of "alkali-free" glass substrates. Moreover, to achieve higher productivities on capital intensive TFT production lines, substrates and TFT structures are subjected to harsher process conditions, both chemical and thermal.

At the same time, increased display resolutions is an important performance trend, especially where finer TFT circuit structures are required. To maintain adequate conductance in gate conductors, thicker metal structures are desirable.

Some of these ensuing TFT panel design and process trends may eventually place greater demands on the glass substrate and overlaying device layers. It would therefore be desirable to increase the adhesion robustness of gate conductors which must be deposited directly on glass substrates, and thereby provide the AMLCD-maker with much greater design and process latitude for reducing costs and enhancing display performance.

It would further be desirable to achieve these results without visibly affecting the quality of the glass. Consequently, the light transmittance of the resultant glass sheet should remain as high as possible, while the light scattering inherent in the glass sheet should remain as low as possible. For this reason, methods which severely increase the roughness of the glass sheet, such as some of those methods which employ mechanical abrasion of the surface, should be avoided. In particular, those methods that result in an RMS surface roughness greater than 0.04 microns should preferably be avoided. Most preferably, RMS surface roughnesses greater than 0.025 microns should preferably be avoided.

The present invention facilitates production of such displays by employing a silicate glass and chemically treating the surface of the glass to improve adherence of a metal film. Thereby, it provides an improved method of producing display devices, such as those employing a thin film transistor on a glass substrate. The present invention accomplishes this without having to resort to treatments which result in relatively severe chemical or mechanical roughening, as was the case with much of the prior art.

SUMMARY OF THE INVENTION

The invention resides in a method of improving adherence of a metal film deposited directly on a silicate glass substrate for a display panel, comprising altering the surface of the silicate glass substrate by chemical treatment and depositing the metal film on the chemically altered surface of the silicate glass substrate. Using the methods of the present invention, these effects may be achieved without visibly altering the appearance of the glass. In addition, these results are achieved without having to use those mechanical abrasion techniques which result in severe abrasion to the surface of the glass, e.g., that which would cause an RMS surface roughness greater than 0.04 microns. Of course, it should be noted that the invention is still applicable to glass which has been mechanically surface polished (as float glass often is for flat panel display applications), as long as the surface roughness of the glass after polishing is not too great to make it unsuitable for flat panel display applications.

The invention further resides in a method of producing a thin film transistor on a silicate glass panel for an AMLCD device by depositing a metal film on the silicate glass panel and patterning the metal film to form electrically conducting gate lines, comprising chemically treating the surface of the silicate glass panel to improve adherence of the metal to the glass and depositing the metal film on the chemically treated surface of the silicate glass panel. The metal preferably is deposited using sputter deposition techniques.

DESCRIPTION OF THE INVENTION

The present invention relates to a method for depositing metal films onto glass surfaces. The method of the present invention is useful for depositing such films on all of the typical glass surfaces currently in use in the LCD industry today, including both as-formed and polished glass surfaces.

Sheet glass made by the Dockerty process (which is described, for example, in U.S. Pat. Nos. 3,338,696 and 3,682,609 (Dockerty)) is highly desirable because a relatively thin sheet can be produced with a pristine surface. This minimizes the weight in an article such as an LCD panel, and avoids the need for costly finishing steps such as polishing. Sheet glass produced by other processes, such as that known as the float process, is thicker. Also, it tends to be contaminated by the metal on which it is floated. Consequently, as currently produced, it must be ground and polished to produce an adequate panel.

It has been common practice in producing LCD devices to apply a barrier layer over the glass surface to avoid migration of alkali metal ions which tend to degrade an LCD device. Primarily, the barrier layers employed have been silica or alumina films. However, the advent of sheet glass compositions nominally free of alkali metal ions has led to a desire to omit the barrier layer film, in order to eliminate process steps and their associated costs in TFT production.

A standard ASTM test No. D3359-87 has been employed to determine adhesion robustness of the films. This relatively severe test, which simulates surface conditions where mechanical defects exist, involves scribing each film to form a grid of small squares. Microscopic examination of the scribed edges revealed that adherence was dependent on buckling of the metal film. This was believed to be a result of the compressive stress developed in the metal film during deposition and cooling.

Earlier filed U.S. patent application Ser. No. 08/277,408 discloses that the adherence of a metal film to glass can be improved by a treatment of the glass surface with certain chemicals prior to deposition of a metal film on the surface. One embodiment of this application involved combining i) a fluorine-containing compound, that is, a source of active fluorine ion, and ii) a strong (highly dissociating) acid that leaches metals other than silica from the glass surface, such as hydrochloric acid. One such suitable mixture is a mixed acid solution of 0.01–1M hydrofluoric acid (HF) and 0.1–6M hydrochloric acid (HCl), more preferably a mixed acid solution of 0.01–0.6M hydrofluoric acid (HF) and 0.1–2.5M hydrochloric acid (HCl).

We have now found that, in a preferred embodiment, the adherence of metal films deposited on glass can be improved by first exposing the glass to an aqueous weak acid solution which contains fluorine ions. By weak acid mixture, it is meant that the acid employed does not strongly dissociate. Preferably, the dissociation constant of such acids is less than $10^{-1}$. Also preferably, the pH of such acid solutions is between 1 and 6. We believe that, as a consequence of the higher pH, no significant leaching of metal constituents from the glass takes place. The use of the weak acids is considerably different from the teachings of the earlier filed U.S. patent application Ser. No. 08/277,408, which typically employed acid solutions having a pH of less than zero.

Such weak acid solutions can be accomplished in a variety of ways. For example, single reagent media can be achieved using mixtures of single compounds and water, such as fluophosphoric acid or fluophosphate salts (e.g. sodium, potassium, or ammonium monofluophosphates or sodium, potassium, or ammonium hexafluophosphates), fluosilic acid or fluosilicate salts, fluoboric acid or fluoborate salts, fluoaluminate salts, stannous fluoride, and stannic fluoride. In such media, the single, self-sufficient reagent interacts with the water to yield both the active fluorine containing ion and weak-acid components. Of course, combinations of the above ingredients could also be employed.

Alternatively, suitable weak acid mixtures can be achieved by combining a fluorine containing material with at least one weak acid, such as, for example, the organic weak acids (e.g., citric, tartaric, oxalic, phthalic, formic, acetic), as well as the inorganic weak acids (e.g. boric, HF, silicic and phosphoric acids).

Examples of suitable fluorine containing compounds include HF, $NH_4F$, $NH_4HF_2$, $(NH_4)_3AlF_6$, $NH_4PF_6$, $(NH_4)_2SiF_6$, $NH_4BF_4$, $SnF_2$, $SnF_4$, and $Na_2PO_3F$. The preferred fluorine containing compounds however, are fluorine containing salts, such as, for example, NaF, $ZnF_2$, $AlF_3$, $CeF_3$, $CeF_4$, $TaF_5$.

The weak acid solutions of the present invention preferably employ a concentration of fluorine containing compound in the mixed solution of 0.005 to 0.6M, more preferably about 0.01–0.1M, and most preferably about 0.01 to 0.05M. The weak acid in such solutions preferably is present in such solutions in a concentration of about 0.05 to 2M, more preferably 0.1 to 0.5M, and most preferably about 0.1 to 0.3M.

In the most preferred embodiments, a mixture of a fluorine containing compound and one of either, acetic, citric or phosphoric acid are mixed together. For example, in preferred embodiment, 0.01–0.06M NaF is mixed with 0.05–2M $H_3PO_4$, more preferably 0.02–0.05M NaF is mixed with 0.1–0.3M $H_3PO_4$.

The acid solutions should preferably be employed in accordance with the present invention so that they do not visibly alter the transmission or light scattering characteristics of the glass. The light scattering should be less than 1.0, preferably less than 0.5 percent, so that no visible haze will be apparent. Preferably, after exposure of the glass to the acid mixture, the glass exhibits a RMS surface roughness which is less than about 0.025 microns, more preferably less than about 0.01 microns, and most preferably less than about 0.009 microns. For comparison, Corning Incorporated Code 1737 glass typically has an as-formed RMS surface roughness of about 0.0003–0.0005 microns. Polished float glass which is used in LCD applications typically has an RMS surface roughness between 0.001–0.0012 microns.

It is our belief that, when the acid solutions of the present invention are contacted with such glasses, the active fluorine compound attacks the glass surface, thereby altering its chemical nature. A possible alteration involves converting Si—O bonds to Si—OH bonds. This may also be expressed as the breaking of a bridging oxygen bond between two silicon atoms to form two silanol (Si—OH) groups. The breaking of the oxygen bond may be thought of as catalyzed by the active fluorine. Schematically, this may be shown as:

Si—O—Si+2F⁻→Si—F+F—Si.

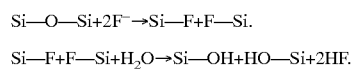

It appears that the metal adheres better to the chemically-altered surface, possibly due to creation of a gradient interface, or a metal oxide interlayer.

We believe that the effect of the weak acid component is primarily to effect a favorable pH that enhances the reactivity of the fluorine ions. It may be that the higher pH shifts the fluorine ion and water chemical equilibrium toward the formation of bifluoride ($HF_2^-$) ions rather than fluoride ($F^-$) ions. In any event, compressive stress between the metal film and the glass is, in some manner, alleviated or accommodated.

A similar effect can be attained using a mixture of a fluorine compound and a very dilute concentration of a strong acid, e.g., 0.02M HF and 0.01M HCl, such that the desirable lower active fluoride and higher pH ranges are simulated. However, such treatments are less desirable for large scale production application, due to frequent need for monitoring and adjustment.

The treatment of glass substrate surfaces with mixed acids in accordance with the present invention enhances the adhesion robustness of gate metals directly deposited on glass, and thereby enables greater design and process latitudes in the manufacture of Active Matrix Liquid Crystal Displays (AM-LCD's). The fluorided weak acid treatment, which preferably is further supplemented by the use of more chemically durable glass, enhances adhesion robustness, both initially and over time.

A recent publication by 1-Wei Wu in *Journal of the SID*, 2/1, 1994, entitled "High-Definition Displays and Technology Trends in TFT-LCDs" reports metals used by various manufacturers in producing gate lines for AMLCD devices. These metals include aluminum, chromium, tantalum, molybdenum, and alloys thereof.

Analysis of glass samples which have been sputter deposited with such metals after treatment with the acid solutions of the present invention indicate that a metal oxide layer is formed during the initial stages of sputter deposition. It is believed that this initial oxide layer is due to the altering of the surface chemistry discussed above. Preferably, the thickness of this oxide layer is between about 30 and 1000 angstroms, more preferably about 50–300 angstroms, and most preferably about 50–150 angstroms. After treating the glass using the fluoride weak acid solutions in accordance with the present invention, oxide layers in these thickness ranges can be sputter deposited using metals selected from group consisting of aluminum, chromium, tantalum and molybdenum-tantalum alloys. Surprisingly, these oxide layers can be deposited using sputtering atmospheres having less than 2 percent, and even less than 1 percent oxygen (preferably these layers are deposited in an oxygen-free atmosphere). The fact that such oxide layers can be deposited without a more strongly oxidizing atmosphere further supports the theory that the chemistry of the glass surface is altered with the fluoride weak acid solutions of the present invention. We have found that the coated glass products having such initial metal oxide layers have much improved adhesion compared to products which do not.

In one embodiment, the metal is deposited directly after the treatment. By "directly after", it is meant that the metal is deposited before any other processes which would substantially alter the surface chemistry of the glass (e.g., ion etching) are employed. In this way, the altered surface chemistry produced by contact with the acid solutions is at least substantially retained prior to the metal deposition process. An example of a subsequent process which would not substantially alter surface chemistry is water rinsing.

A screening test for initial adhesion of metal to glass involves sputter depositing a metal film on a clean glass surface to a required thickness, for example 300 or 500 nm thickness. This film is scribed with a sharp instrument to form a grid of small squares. A strip of cellophane tape with a pull force of greater than 25 ounces is then pressed firmly over the grid and pulled away. Depending on the number of metal squares removed from the grid, the adhesion is graded from 0 (>65% removed) to 5 (none removed).

A condition of both elevated temperature and humidity was used as a means to accelerate delayed delamination and assess aged adhesion under aggravated conditions. In these tests, a scribed sample is placed in a test oven for 24 hours. The oven is maintained at 85±2° C. with an atmosphere of 85±4% relative humidity. The sample is then removed and tape tested as before. Alternatively, the sample is photographed at a magnification such that the edges of the scribed lines in the magnified photo can be examined for buckling. The invention is further illustrated by the following examples, which are meant to be illustrative, and not in any way limiting, to the claimed invention.

EXAMPLE 1

Largely for comparative purposes, this Example is provided to illustrate a solution composition previously disclosed in U.S. patent application Ser. No. 08/277,408. Samples for glass testing were prepared from 1.1 mm thick Corning Code 1737 glass sheet, which is produced by the Dockerty downdraw process. For treatment of these glass samples, acid solutions were prepared containing hydrofluoric acid in strengths varying from 0.05 to 0.6 molar and hydrochloric acid in strengths varying from 0.1 to 5.0 molar. The glass samples were dipped in the acid mixtures for times varying from 5 to 25 minutes. The time of treatment may be shortened by heating the treatment bath, or agitating the bath. The samples then had metal films purposely deposited at a greater than normal thickness of about 600 mm and scribed as described above.

Subsequent testing indicated that the concentration of HF in the chemical mixtures could be considerably diluted with equally effective results. Thus, solutions in which the HF strength was as low as 0.01M were successfully employed.

In order to test the mixed acid solutions on a commercial scale, commercial size panels that were greater than 300 mm wide and greater than 400 mm long by 1.1 mm thick were employed. These panels were cleaned and immersed in mixed acid baths for times of 2–10 minutes at ambient temperature (about 25° C.). These panels were immersed in acid solutions having concentrations of 0.01–0.05M HF and 1.0–2.5M HCl.

Individual schedules employed in the testing are set forth in TABLE 1 below.

TABLE 1

| Sample | Molar Concentration | | Time |
|--------|------|------|--------|
|  | HF | HCl | (minutes) |
| 1 | 0.01 | 1.0 | 8 |
| 2 | 0.01 | 2.0 | 8 |
| 3 | 0.03 | 1.5 | 8 |
| 4 | 0.05 | 1.5 | 8 |
| 5 | 0.03 | 2.0 | 8 |
| 6 | 0.05 | 2.0 | 8 |
| 7 | 0.05 | 2.5 | 8 |
| 8 | 0.05 | 2.0 | 2 |
| 9 | 0.05 | 2.0 | 4 |
| 10 | 0.05 | 2.0 | 6 |
| 11 | 0.05 | 2.0 | 10 |

All of these samples resulted in acceptable adhesion, wherein there was no evidence of either immediate or delayed delamination. When Corning Code 1737 glass is treated using the solution of example 6, the RMS surface roughness typically is between about 0.0006 and 0.0008 microns.

While it is indeed surprising that the above concentrations worked as successfully as they did without harming the optical qualities of the glass, it is even more surprising that the much less corrosive weak acid solutions of the invention work just as effectively, as evidenced by the following example.

EXAMPLE 2

Samples for glass testing were again prepared from 1.1 mm thick Corning Incorporated Code 1737 glass sheet produced by the Dockerty downdraw process. For treatment of these glass samples, acid solutions were prepared containing a fluorine containing compound (NaF) and one of either citric or phosphoric acids. The glass samples were dipped in the acid mixtures for times varying from 1 to 10 minutes. The time of treatment may be shortened by increasing the concentration of the fluorine containing bath, heating the treatment bath, or agitating the bath. The samples then had metal films purposely deposited at a greater than normal thickness of about 600 mm and scribed as described above.

In order to test the mixed acid solutions on a commercial scale, commercial size panels that were greater than 300 mm wide and greater than 400 mm long by about 0.7 to 1.1 mm thick were employed. These panels were cleaned and immersed in mixed acid baths for times of 2–10 minutes at temperatures between about 20° and 65° C.

Individual schedules employed in the testing are set forth in TABLE 2 below.

TABLE 2

| Sample | Molar Concentration | | Time | Temp. |
|---|---|---|---|---|
| | NaF | Citric acid | (minutes) | (°C.) |
| 1 | 0.01 | 0.2 | 5 | 62 |
| 2 | 0.02 | 0.2 | 5 | 62 |
| 3 | 0.05 | 0.2 | 5 | 62 |
| 4 | 0.02 | 0.2 | 5 | 35 |
| | NaF | $H_3PO_4$ | (minutes) | (°C.) |
| 5 | 0.1 | 0.5 | 5 | 22 |
| 6 | 0.02 | 0.2 | 2 | 35 |
| 7 | 0.02 | 0.2 | 5 | 35 |
| 8 | 0.04 | 0.2 | 2 | 35 |
| 9 | 0.04 | 0.2 | 5 | 35 |

All of the above examples resulted in extremely good adhesion of the sputtered films to the glass substrate. Sample 9 of Example 2 is the most preferred embodiment of the present invention.

The methods of the present invention have proven to be effective on a wide variety of commercial substrates, regardless of whether these glass surfaces were as-formed or surface polished. Testing of the method on different glasses indicates that properties of the glass substrate may have an influence on the effectiveness of the method. In particular, the inherent chemical durability of a given glass surface appears to be important. Durability in this case refers to resistance to glass dissolution which may be evidenced by weight change in an accelerated acid test.

A measure of glass durability is the loss in weight that occurs when a test sample of a glass is immersed in a 5% by weight solution of HCl for 24 hours at 95° C. Durability of the Corning code 1737 glass employed in the tests reported above was determined to be about 0.5 mg/cm², a very favorable value. As indicated, this glass consistently provided excellent metal adherence after chemical treatment of its surface. In view of such tests, our method is successful on glasses having durability values under 5 milligrams/sq. cm.

Although the invention has been described in detail for the purpose of illustration, it is understood that such detail is solely for that purpose and variations can be made therein by those skilled in the art without departing from the spirit and scope of the invention which is defined by the following claims.

What is claimed is:

1. A method of improving adherence of a metal film deposited directly on a silicate glass substrate for a display panel, comprising:

exposing the silicate glass substrate to an acid solution containing fluorine containing-ions in an amount sufficient to increase the adhesion of metal to be deposited without visibly affecting the transmissive quality of the glass substrate; and sputter depositing the metal film on the surface of the silicate glass substrate.

2. The method of claim 1, wherein said exposing step comprises exposing said glass to an acid solution having a pH between 1 and 6.

3. The method of claim 2, wherein said exposing step comprises exposing the substrate to an aqueous solution of at least one fluorine containing compound.

4. The method of claim 3, wherein said acid solution in said exposing step comprises at least one compound selected from the group consisting of fluophosphoric acid, fluophosphate salt, fluosilic acid, fluosilicate salt, fluoboric acid, fluoborate salt, fluoaluminate salt, stannous fluoride, stannic fluoride, and mixtures thereof.

5. The method of claim 1, wherein said exposing step comprises exposing said substrate to a mixture of a fluorine containing compound and an acid.

6. The method of claim 5, wherein said acid in said exposing step comprises an acid selected from the group consisting of citric, acetic and phosphoric acids.

7. The method of claim 2, wherein said exposing step comprises chemically altering silicate bonds at the surface of the silicate glass substrate while resulting in a RMS surface roughness, after said exposing step, which is less than about 0.04 microns.

8. The method of claim 5 wherein the concentration of fluorine containing compound in the mixed solution is 0.005 to 0.6M, and the concentration of the acid in the solution is 0.05 to 2M.

9. The method of claim 5 wherein the concentration of fluorine containing compound in the mixed solution is 0.01 to 0.1M, and the concentration of the acid in the solution is 0.01 to 0.5M.

10. The method of claim 2 wherein the concentration of fluorine containing compound in the mixed solution is 0.01 to 0.1M, and the concentration of the acid in the solution is 0.01 to 0.5M.

11. The method of claim 9, wherein the fluorine containing compound is a fluorine containing salt.

12. The method of claim 10, wherein the acid is phosphoric acid in a concentration of 0.05–2.0M.

13. The method of claim 6, wherein said exposing step comprises exposing the silicate glass substrate to the solution by immersing the substrate in a bath of the solution for 1–25 minutes at a temperature between 20° and 65° C.

14. The method of claim 8, wherein said exposing step comprises exposing the glass substrate to a mixture of a fluorine containing compound and a second acid selected from the group consisting of citric, acetic and phosphoric acid, wherein said mixture is sufficient to increase the adhesion of the metal to be deposited while still enabling the light transmitting quality of the glass substrate to be suitable for LCD applications.

15. The method of claim 1, wherein the metal deposited on the exposed surface of the silicate glass substrate is selected from the group consisting of aluminum, chromium, tantalum, molybdenum, and alloys thereof.

16. A nonmechanically abrading method for improving adherence of sputter deposited metal films on glass substrates for display panel applications, comprising:

exposing a silicate glass panel substrate for a flat panel display device to a acid solution containing fluorine and having a pH between 1 and 6 such that the adherence of a metal film to be deposited on the surface of the silicate glass panel is enhanced, while resulting in a RMS surface roughness, after said exposing step, which is less than about 0.04 microns;

directly thereafter sputter depositing the metal film on the exposed surface of the silicate glass panel; and patterning the metal film to form a thin film transistor for a flat panel display.

17. The method of claim 16 wherein the concentration of fluorine containing compound in the mixed solution is 0.005 to 0.6M, and the concentration of the acid in the solution is 0.05 to 2M.

18. The method of claim 16 wherein the concentration of fluorine containing compound in the mixed solution is 0.01 to 0.1M, and the concentration of the acid in the solution is 0.01 to 0.5M.

19. A method of making metal coated glass for use in information display applications, comprising:

exposing a glass substrate to a mixture of a fluorine containing compound and at least one acid selected from the group consisting of citric, acetic and phosphoric acid, said acid mixture is sufficient to increase the adhesion of metal to be deposited without visibly affecting the transmissive quality of the glass substrate;

depositing a metal oxide layer having a thickness between about 50 and 500 angstroms directly on said glass; and sputter depositing a metal over said metal oxide.

20. The method of claim 19, wherein said depositing a metal oxide layer step comprises sputter depositing a metal oxide layer having a thickness between about 50 and 150 angstroms in an atmosphere having less than 2 percent oxygen.

21. The method of claim 1, wherein said sputter depositing step comprises sputtering the metal film directly onto the silicate glass substrate.

* * * * *